US009278342B2

(12) United States Patent
Ghosh

(10) Patent No.: US 9,278,342 B2
(45) Date of Patent: Mar. 8, 2016

(54) METHOD OF MODIFYING A PHOSPHORUS-CONTAINING ZEOLITE CATALYST

(75) Inventor: Ashim Kumar Ghosh, Houston, TX (US)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 638 days.

(21) Appl. No.: 13/540,022

(22) Filed: Jul. 2, 2012

(65) Prior Publication Data

US 2014/0005033 A1    Jan. 2, 2014

(51) Int. Cl.
     *B01J 29/06*      (2006.01)
     *B01J 29/40*      (2006.01)
     *C01B 39/02*      (2006.01)
     *C01B 39/10*      (2006.01)
     *B01J 37/28*      (2006.01)
     *B01J 35/10*      (2006.01)

(52) U.S. Cl.
CPC ............... *B01J 29/40* (2013.01); *C01B 39/026* (2013.01); *C01B 39/10* (2013.01); *B01J 35/1038* (2013.01); *B01J 35/1042* (2013.01); *B01J 35/1047* (2013.01); *B01J 37/28* (2013.01); *B01J 2229/10* (2013.01); *B01J 2229/14* (2013.01); *B01J 2229/16* (2013.01); *B01J 2229/186* (2013.01); *B01J 2229/30* (2013.01); *B01J 2229/36* (2013.01); *B01J 2229/37* (2013.01); *B01J 2229/40* (2013.01)

(58) Field of Classification Search
USPC .......................................... 502/60, 73, 77, 85
See application file for complete search history.

(56) References Cited

U.S. PATENT DOCUMENTS

| | | |
|---|---|---|
| 3,562,345 A | 2/1971 | Mitsche |
| 3,702,886 A | 11/1972 | Argauer et al. |
| 3,950,242 A | 4/1976 | Garwood et al. |
| 3,962,364 A | 6/1976 | Young |
| 3,965,207 A | 6/1976 | Weinstein |
| 4,002,697 A | 1/1977 | Chen |
| 4,025,606 A | 5/1977 | Acres |
| 4,061,724 A | 12/1977 | Grose et al. |
| 4,080,395 A | 3/1978 | Butter |
| 4,080,396 A | 3/1978 | Butter |
| 4,086,287 A | 4/1978 | Kaeding et al. |
| 4,100,215 A | 7/1978 | Chen |
| 4,115,424 A | 9/1978 | Unland et al. |
| 4,140,726 A | 2/1979 | Unland et al. |
| 4,152,364 A | 5/1979 | Chu |
| 4,250,345 A | 2/1981 | Chu |
| 4,278,827 A | 7/1981 | Chu et al. |
| 4,363,750 A | 12/1982 | Rozovsky et al. |
| 4,377,718 A | 3/1983 | Sato et al. |
| 4,380,685 A | 4/1983 | Chu |
| 4,409,132 A | 10/1983 | Forbus et al. |
| 4,415,477 A | 11/1983 | Rozovsky et al. |
| 4,417,076 A | 11/1983 | Rozovsky et al. |
| 4,444,989 A | 4/1984 | Herkes |
| RE31,919 E | 6/1985 | Butter et al. |
| 4,536,375 A | 8/1985 | Holt et al. |
| 4,548,914 A | 10/1985 | Chu |
| 4,554,394 A | 11/1985 | Forbus et al. |
| 4,590,321 A | 5/1986 | Chu |
| 4,623,530 A | 11/1986 | Cullo et al. |
| 4,623,633 A | 11/1986 | Young |
| 4,638,106 A | 1/1987 | Pieters et al. |
| 4,657,884 A | 4/1987 | Luft et al. |
| 4,665,251 A | 5/1987 | Chu |
| 4,670,616 A | 6/1987 | De Simone et al. |
| 4,673,767 A | 6/1987 | Nimry et al. |
| 4,681,745 A | 7/1987 | Pinto |
| 4,694,114 A | 9/1987 | Chu et al. |
| 4,695,442 A | 9/1987 | Pinto et al. |
| 4,695,666 A | 9/1987 | Chao et al. |
| 4,695,667 A | 9/1987 | Sumitani et al. |
| 4,704,495 A | 11/1987 | Dessau |
| 4,716,135 A | 12/1987 | Chen |
| 4,721,827 A | 1/1988 | Cullo et al. |
| 4,727,209 A | 2/1988 | Chao |

(Continued)

FOREIGN PATENT DOCUMENTS

| | | |
|---|---|---|
| EP | 2025402 A1 | 2/2009 |
| JP | 61221137 A2 | 10/1971 |
| WO | WO2009/016156 A1 | 2/2009 |

OTHER PUBLICATIONS

F.M. Bautista, et al., Toluene Methylation ON AlPO4-Al2O3 Catalysts, React. Kinet. Catal. Lett., 1996, pp. 61-70, vol. 57, No. 1.
Oyvind Mikkelsen, et al., Use of Isotopic Labeling for Mechanistic Studies of the Methanol-to-Hydrocarbons reaction. Methylation of toluene with Methanol Over H-ZSM-5, H-Mordenite and H-Beta, Microporous and Mesoporous Materials, 2000, pp. 93-113, vol. 40.
P.G. Smirniotis, et al., Alkylation of Benzene or Toluene with MeOH or C2H4 over ZSM-5 or B-Zeolite: Effect of the Zeolite Pore Openings and of the Hydrocarbons Involved on the Mechanism of Alkylation, Ind Eng. Chem. Res., 1995, pp. 1517-1528, vol. 34.
F.M. Bautista, et al., Continuous Flow Toluene Methylation Over AlPO4 and AlPO4-Al2O3 Catalysts, Catalysis Letters, 1994, pp. 159-167, vol. 26.
Y.Oumi et al., Effect of Framework Structure on the Dealumination-Realumination Behavior of Zeolite, Materials Chemistry and Physics, 78, 2002, pp. 551-557.

(Continued)

*Primary Examiner* — Elizabeth Wood
(74) *Attorney, Agent, or Firm* — Cantor Colburn LLP

(57) ABSTRACT

A method of modifying a phosphorus-treated zeolite catalyst is carried out by contacting an unbound and calcined phosphorus-treated pentasil zeolite with water in a water treatment wherein at least a portion of the water is in a liquid phase. The water treatment is sufficient to remove at least 80% by weight or more of phosphorus from the phosphorus-treated zeolite and provide an increase in the pore volume of the zeolite by at least 50% prior to the water treatment to form a modified phosphorus-treated zeolite catalyst. A zeolite catalyst is also provided in the form of a phosphorus-containing pentasil zeolite having a phosphorus content of 7.5% or less by weight of zeolite and a $^{27}$Al MAS NMR peak at 50 ppm that is greater than any other $^{27}$Al MAS NMR and a pore volume of 0.2 ml/g or more.

27 Claims, 5 Drawing Sheets

(56) References Cited

U.S. PATENT DOCUMENTS

| | | |
|---|---|---|
| 4,746,763 A | 5/1988 | Kocal |
| 4,758,328 A | 7/1988 | Young |
| 4,761,513 A | 8/1988 | Steacy |
| 4,781,815 A | 11/1988 | Pellet et al. |
| 4,847,223 A | 7/1989 | Le Van Mao et al. |
| 4,861,930 A | 8/1989 | Cottrell et al. |
| 4,873,067 A | 10/1989 | Valyocsik et al. |
| 4,891,197 A | 1/1990 | Derouane et al. |
| 4,891,467 A | 1/1990 | Sikkenga |
| 4,902,406 A | 2/1990 | Valyocsik |
| 4,910,007 A | 3/1990 | Pinto et al. |
| 4,912,073 A | 3/1990 | Chu |
| 4,914,067 A | 4/1990 | Pellet et al. |
| 4,935,574 A | 6/1990 | D'Amore et al. |
| 4,962,255 A | 10/1990 | Fraenkel et al. |
| 4,973,399 A | 11/1990 | Green et al. |
| 4,973,781 A | 11/1990 | Valyocsik et al. |
| 4,980,052 A | 12/1990 | Green et al. |
| 5,041,402 A | 8/1991 | Casci et al. |
| 5,043,502 A | 8/1991 | Martindale et al. |
| 5,047,141 A | 9/1991 | Chu |
| 5,068,483 A | 11/1991 | Barthomeuf et al. |
| 5,094,995 A | 3/1992 | Butt et al. |
| 5,105,047 A | 4/1992 | Waller |
| 5,108,579 A | 4/1992 | Casci |
| 5,110,776 A | 5/1992 | Chitnis et al. |
| 5,118,482 A | 6/1992 | Narayana et al. |
| 5,124,299 A | 6/1992 | Waller |
| 5,171,921 A | 12/1992 | Gaffney et al. |
| 5,173,461 A | 12/1992 | Absil et al. |
| 5,178,748 A | 1/1993 | Casci et al. |
| 5,210,356 A | 5/1993 | Shamshoum et al. |
| 5,227,558 A | 7/1993 | Shamshoum et al. |
| 5,231,064 A | 7/1993 | Absil et al. |
| 5,233,102 A | 8/1993 | Butt et al. |
| 5,246,688 A | 9/1993 | Faust et al. |
| 5,248,841 A | 9/1993 | Young |
| 5,254,767 A | 10/1993 | Dwyer |
| 5,254,770 A | 10/1993 | Olson et al. |
| 5,294,332 A | 3/1994 | Klotz |
| 5,294,578 A | 3/1994 | Ho et al. |
| 5,315,033 A | 5/1994 | Butt et al. |
| 5,318,696 A | 6/1994 | Kowalski |
| 5,321,183 A | 6/1994 | Chang et al. |
| 5,330,732 A | 7/1994 | Ishibashi et al. |
| 5,336,478 A | 8/1994 | Dwyer et al. |
| 5,336,824 A | 8/1994 | Shamshoum et al. |
| 5,345,021 A | 9/1994 | Casci et al. |
| 5,348,643 A | 9/1994 | Absil et al. |
| 5,349,113 A | 9/1994 | Chang et al. |
| 5,365,003 A | 11/1994 | Chang et al. |
| 5,366,948 A | 11/1994 | Absil et al. |
| 5,367,100 A | 11/1994 | Gongwei et al. |
| 5,371,307 A | 12/1994 | Guth et al. |
| 5,378,670 A | 1/1995 | Kumar |
| 5,380,690 A | 1/1995 | Zhicheng et al. |
| 5,385,718 A | 1/1995 | Casci et al. |
| 5,387,732 A | 2/1995 | Shamshoum et al. |
| 5,399,336 A | 3/1995 | Guth et al. |
| 5,430,212 A | 7/1995 | Butt et al. |
| 5,430,213 A | 7/1995 | Hendriksen et al. |
| 5,446,234 A | 8/1995 | Casci et al. |
| 5,455,213 A | 10/1995 | Chang et al. |
| 5,456,821 A | 10/1995 | Absil et al. |
| 5,464,799 A | 11/1995 | Casci et al. |
| 5,475,179 A | 12/1995 | Chang et al. |
| 5,498,814 A | 3/1996 | Chang et al. |
| 5,503,818 A | 4/1996 | Nicolaides |
| 5,512,260 A | 4/1996 | Kiliany et al. |
| 5,516,736 A | 5/1996 | Chang et al. |
| 5,523,510 A | 6/1996 | Pellet et al. |
| 5,529,964 A | 6/1996 | Weitkamp et al. |
| 5,534,239 A | 7/1996 | Fajula et al. |
| 5,536,894 A | 7/1996 | Degnan et al. |
| 5,541,146 A | 7/1996 | Chang et al. |
| 5,561,095 A | 10/1996 | Chen et al. |
| 5,563,310 A | 10/1996 | Chang et al. |
| 5,569,805 A | 10/1996 | Beck et al. |
| 5,571,768 A | 11/1996 | Chang et al. |
| 5,573,746 A | 11/1996 | Chen |
| 5,576,256 A | 11/1996 | Monque et al. |
| 5,602,066 A | 2/1997 | Beck et al. |
| 5,607,888 A | 3/1997 | Chang et al. |
| 5,607,890 A | 3/1997 | Chen et al. |
| 5,646,314 A | 7/1997 | Crocco et al. |
| 5,648,580 A | 7/1997 | Chen et al. |
| 5,658,454 A | 8/1997 | Absil et al. |
| 5,675,047 A | 10/1997 | Beck et al. |
| 5,689,024 A | 11/1997 | Schmitt |
| 5,698,756 A | 12/1997 | Beck et al. |
| 5,726,114 A | 3/1998 | Chang et al. |
| 5,780,563 A | 7/1998 | Chen et al. |
| 5,789,335 A | 8/1998 | Chen et al. |
| 5,811,613 A | 9/1998 | Bhat et al. |
| 5,833,840 A | 11/1998 | Absil et al. |
| 5,847,255 A | 12/1998 | Ghosh et al. |
| 5,856,603 A | 1/1999 | Rekker et al. |
| 5,902,919 A | 5/1999 | Chen et al. |
| 5,905,051 A | 5/1999 | Wu et al. |
| 5,907,073 A | 5/1999 | Ghosh |
| 5,922,922 A | 7/1999 | Harris et al. |
| 5,925,586 A | 7/1999 | Sun |
| 5,939,597 A | 8/1999 | Dessau et al. |
| 5,951,963 A | 9/1999 | He et al. |
| 5,952,535 A | 9/1999 | King et al. |
| 5,955,641 A | 9/1999 | Chen et al. |
| 5,968,463 A | 10/1999 | Shelef et al. |
| 5,990,031 A | 11/1999 | Ghosh |
| 5,994,603 A | 11/1999 | Mohr et al. |
| 6,034,283 A | 3/2000 | Ban et al. |
| 6,040,257 A | 3/2000 | Drake et al. |
| 6,046,128 A | 4/2000 | Kisen et al. |
| 6,047,544 A | 4/2000 | Yamamoto et al. |
| 6,048,816 A | 4/2000 | Brown et al. |
| 6,057,485 A | 5/2000 | Merrill et al. |
| 6,060,633 A | 5/2000 | Chen et al. |
| 6,074,975 A | 6/2000 | Yao et al. |
| 6,080,303 A | 6/2000 | Cao et al. |
| 6,080,698 A | 6/2000 | Zhang et al. |
| 6,083,865 A | 7/2000 | Drake et al. |
| 6,090,274 A | 7/2000 | Wu et al. |
| 6,090,991 A | 7/2000 | Butler et al. |
| 6,096,938 A | 8/2000 | Ghosh |
| 6,100,437 A | 8/2000 | Koehl et al. |
| 6,124,227 A | 9/2000 | Yao et al. |
| 6,150,293 A | 11/2000 | Verduijn et al. |
| 6,156,949 A | 12/2000 | Brown et al. |
| 6,160,191 A | 12/2000 | Smith et al. |
| 6,187,982 B1 | 2/2001 | Beck et al. |
| 6,211,104 B1 | 4/2001 | Shi et al. |
| 6,217,748 B1 | 4/2001 | Hatanaka et al. |
| 6,222,084 B1 | 4/2001 | Ghosh et al. |
| 6,251,263 B1 | 6/2001 | Hatanaka et al. |
| 6,268,305 B1 | 7/2001 | Butler et al. |
| 6,294,493 B1 | 9/2001 | Strohmaier et al. |
| 6,300,535 B1 | 10/2001 | van den Berge et al. |
| 6,306,790 B1 | 10/2001 | Rodriguez et al. |
| 6,319,484 B1 | 11/2001 | Shore et al. |
| 6,342,153 B1 | 1/2002 | Guan et al. |
| 6,346,190 B1 | 2/2002 | Khare |
| 6,388,156 B1 | 5/2002 | Ou et al. |
| 6,395,664 B1 | 5/2002 | Boehner et al. |
| 6,399,530 B1 | 6/2002 | Chen et al. |
| 6,417,421 B1 | 7/2002 | Yao |
| 6,423,879 B1 | 7/2002 | Brown et al. |
| 6,444,610 B1 | 9/2002 | Yamamoto |
| 6,459,006 B1 | 10/2002 | Ou et al. |
| 6,469,095 B1 | 10/2002 | Gareiss et al. |
| 6,503,862 B1 | 1/2003 | Yamamoto |
| 6,504,072 B1 | 1/2003 | Brown et al. |
| 6,504,074 B2 | 1/2003 | Berduijn et al. |
| 6,506,954 B1 | 1/2003 | Brown et al. |
| 6,518,213 B1 | 2/2003 | Yamamoto et al. |
| 6,548,725 B2 | 4/2003 | Froment et al. |

(56) References Cited

U.S. PATENT DOCUMENTS

| | | |
|---|---|---|
| 6,566,293 B1 | 5/2003 | Vogt et al. |
| 6,576,582 B1 | 6/2003 | Beck et al. |
| 6,589,901 B2 | 7/2003 | Yamamoto |
| 6,613,708 B1 | 9/2003 | Ou et al. |
| 6,613,951 B1 | 9/2003 | Brown et al. |
| 6,642,426 B1 | 11/2003 | Johnson et al. |
| 6,689,929 B2 | 2/2004 | Williams et al. |
| 6,699,811 B1 | 3/2004 | Mohr et al. |
| 6,723,297 B2 | 4/2004 | Chen et al. |
| 6,726,834 B2 | 4/2004 | Quesada et al. |
| 6,770,251 B2 | 8/2004 | Yoshikawa |
| 6,773,694 B1 | 8/2004 | Lesch et al. |
| 6,799,089 B2 | 9/2004 | Toulhoat |
| 6,811,684 B2 | 11/2004 | Mohr et al. |
| 6,812,181 B2 | 11/2004 | van der Berge et al. |
| 6,864,399 B2 | 3/2005 | Merrill et al. |
| 6,943,131 B2 | 9/2005 | Ghosh et al. |
| 7,060,644 B2 | 6/2006 | Ghosh et al. |
| 7,060,864 B2 | 6/2006 | Ghosh et al. |
| 7,084,318 B2 | 8/2006 | Ghosh et al. |
| 7,105,713 B2 | 9/2006 | Ghosh et al. |
| 7,119,239 B2 | 10/2006 | Johnson et al. |
| 7,176,339 B2 | 2/2007 | Iaccino et al. |
| 7,186,873 B2 | 3/2007 | Feng et al. |
| 7,196,237 B2 | 3/2007 | Ghosh et al. |
| 7,232,516 B2 | 6/2007 | Sughure, II et al. |
| 7,279,608 B2 | 10/2007 | Ghosh et al. |
| 7,285,511 B2 | 10/2007 | Ghosh et al. |
| 7,304,194 B2 | 12/2007 | Ghosh et al. |
| 7,363,410 B2 | 4/2008 | Bian et al. |
| 7,368,410 B2 | 5/2008 | Ghosh et al. |
| 7,396,967 B2 | 7/2008 | Iaccino et al. |
| 7,399,727 B2 | 7/2008 | Ghosh et al. |
| 7,446,069 B2 | 11/2008 | Ghosh et al. |
| 7,507,685 B2 | 3/2009 | Ghosh et al. |
| 7,560,608 B2 | 7/2009 | Ghosh et al. |
| 7,576,026 B2 | 8/2009 | Ghosh et al. |
| 7,635,793 B2 | 12/2009 | Ghosh et al. |
| 7,662,737 B2 | 2/2010 | Ghosh et al. |
| 7,674,942 B2 | 3/2010 | Ghosh et al. |
| 7,713,898 B2 | 5/2010 | Ghosh et al. |
| 8,008,223 B2 | 8/2011 | Garcia-Martinez |
| 8,062,987 B2 | 11/2011 | Ghosh et al. |
| 2003/0004383 A1 | 1/2003 | Brown et al. |
| 2003/0055305 A1 | 3/2003 | Beck et al. |
| 2003/0121827 A1 | 7/2003 | van den Berge et al. |
| 2003/0127360 A1 | 7/2003 | van den Berge et al. |
| 2004/0004023 A1 | 1/2004 | Sughrue, II et al. |
| 2004/0087822 A1 | 5/2004 | Buchanan et al. |
| 2004/0158111 A1 | 8/2004 | Johnson et al. |
| 2004/0262200 A1 | 12/2004 | Sughure, II et al. |
| 2005/0020435 A1 | 1/2005 | Beck et al. |
| 2005/0070749 A1 | 3/2005 | Ghosh et al. |
| 2005/0075524 A1 | 4/2005 | Feng et al. |
| 2005/0143613 A1 | 6/2005 | Dakka et al. |
| 2005/0194289 A1 | 9/2005 | Overbeek et al. |
| 2005/0202956 A1 | 9/2005 | Sterte et al. |
| 2005/0239635 A1* | 10/2005 | Ghosh et al. ............... 502/64 |
| 2005/0240070 A1 | 10/2005 | Ghosh et al. |
| 2006/0151358 A1 | 7/2006 | Brown et al. |
| 2006/0252633 A1* | 11/2006 | Ghosh et al. ............... 502/77 |
| 2007/0015658 A1 | 1/2007 | Turaga et al. |
| 2007/0032374 A1 | 2/2007 | Lau et al. |
| 2007/0149384 A1 | 6/2007 | Ghosh et al. |
| 2007/0225156 A1 | 9/2007 | Sughrue, II et al. |
| 2008/0058564 A1 | 3/2008 | Iaccino et al. |
| 2008/0306317 A1* | 12/2008 | Ghosh et al. ............... 585/466 |
| 2009/0253949 A1 | 10/2009 | Ghosh et al. |
| 2010/0113850 A1 | 5/2010 | Ghosh et al. |
| 2010/0168484 A1 | 7/2010 | Kyotani et al. |
| 2011/0137099 A1 | 6/2011 | Ghosh et al. |

OTHER PUBLICATIONS

T. Sano et al., Realumination of Dealuminated HZSM-5 Zeolites by Acid Treatment and Their Catalytic Properties, Microporous and Mesoporous Materials, 31, 1999, pp. 89-95.

B. Sulikowskie et al., Acidity and Catalytic Properties of Realuminated Zeolite Y, J. Phys. Chem. B., 101, 1997, pp. 6929-6932.

P.J. Barrie et al., Neutron Diffraction Studies of Realuminated Zeolite Y, J. Chem. Soc. Chem. Commun., 1991, pp. 592-594.

H. Hamdan et al., Hydrothermal Isomorphous Substitution of Aluminum in Faujastic Frameworks: Second Generation Zeolite, J. Phys. Chem. 93, 1989, pp. 350-356.

A. Omegna et al., Dealumination and Realumination of Microcrystalline Zeolite Beta; An XRD, FTIR and Quantitative Multinuclear (MQ) MAS NMR Study, Phys. Chem. Chem. Phys., 6, 2004, pp. 447-452.

Y. Oumi et al., Realumination of Zeolite Y Under Acidic Conditions, J. Porous Matter, 14, 2007. pp. 19-26.

N.V. Beznis et al., Oxidation of Methane to Methanol and Formaldehyde Over Co-ZSM-5 Molecular Sieves: Tuning the Reactivity and Selectivity by Alkaline and Acid Treatments of the Zeolite ZSM-5 Agglomerates, Microporous and Mesoporous Materials, 138, 2011, pp. 176-183.

Dan Liu et al., Steaming and Washing Effect of P/HZSM-5 in Catalytic Cracking of Naphtha, Catalysis Today, Oct. 26, 2010, pp. 154-157, vol. 164, No. 1, Elsevier, NL.

G. Lischke, Spectroscopic and Physicochemical Characterizatio of P-Modified H-ZSM-5, Journal of Catalysis, Nov. 1, 1991, pp. 229-243, vol. 132, No. 1.

International Search Report for International Application No. PCT/US2012/071922, May 22, 2013, pp. 1-5, International Searching Authority.

Written Opinion of the International Searching Authority for International App. No. PCT/US2012/071922, May 22, 2013, pp. 1-9, International Searching Authority.

Flanigen et al., Silicalite, A New Hydrophobic Crystalline Silica Molecular Sieve, Nature vol. 271 (Feb. 9, 1978) pp. 512-516.

* cited by examiner

METHOD OF MODIFYING A PHOSPHORUS-CONTAINING ZEOLITE CATALYST

TECHNICAL FIELD

The invention relates generally to phosphorus-containing zeolite catalysts and their preparation.

BACKGROUND

A zeolite is a crystalline hydrated aluminosilicate that has a tetrahedra structure of the formula $TO_4$. The tetrandra structure is in the form of a three-dimensional network that is formed by sharing oxygen atoms and wherein T represents tetravalent atoms, such as silicon, and trivalent atoms, such as aluminum.

In the crystalline structure of the zeolite there are pores and channels which may be interconnected. The dimensions and configuration of these pores and channels allow access of molecules of certain sizes or configurations, thus promoting the selectivity to certain products when the zeolite is used as a catalyst. Elements, such as metals, may also be deposited on or incorporated with the zeolite to facilitate selectivity or catalytic enhancement of the zeolite catalyst.

In certain instances phosphorus is used to modify the zeolite structure. In phosphorus treatment of zeolites, the zeolite is modified so that the pores and channels are occluded by various materials resulting from the treatment. This typically includes phosphates, phosphates bonded with non-framework aluminum and silicon, and amorphous alumina that is present as debris within the zeolite pore channels. Such catalysts have been shown to have improved catalysts characteristics in certain applications. Furthermore, the framework aluminum of the zeolite is decreased as a result of the phosphorus treatment and/or calcination.

The present invention is directed to a method of modifying phosphorus-containing or phosphorus-treated pentasil zeolite catalysts that have unique properties and characteristics that differ from conventional phosphorus-containing or phosphorus-treated zeolite catalysts.

SUMMARY

A method of modifying a phosphorus-treated zeolite catalyst is performed by contacting an unbound and calcined phosphorus-treated pentasil zeolite with water in a water treatment. In the water treatment, at least a portion of the water is in a liquid phase to facilitate removal of at least 70% by weight or more of phosphorus from the phosphorus-treated zeolite and provide an increase in the pore volume of the zeolite by at least 50% prior to the water treatment to form a modified phosphorus-treated zeolite catalyst.

In particular embodiments, the phosphorus-treated zeolite has a phosphorus content of from 1% to 25% by weight of the zeolite prior to the water treatment. In other embodiments, the phosphorus-treated zeolite has a phosphorus content of from 5% to 15% by weight of the zeolite prior to the water treatment.

In certain embodiments, the modified phosphorus-treated zeolite catalyst may exhibit an increase in any $^{27}Al$ MAS NMR peak at 50 ppm compared to the phosphorus-treated zeolite prior to the water treatment.

The pentasil zeolite may contain 10-membered ring pore openings. In certain instances, the zeolite may have a silica/alumina molar ratio of at least 25 or more and in others the zeolite may have a silica/alumina molar ratio of at least 200 or more.

The water treatment may occur at a temperature of from 25° C. to 120° C.

In certain embodiments, the final phosphorus content of the modified phosphorus-treated zeolite catalyst is from 3% or less by weight of the zeolite. In other embodiments the final phosphorus content of the modified phosphorus-treated zeolite catalyst may be from 0.5% to 2% by weight of the zeolite.

In certain instances, the modified phosphorus-treated zeolite catalyst may have a pore volume of 0.2 ml/g or more.

In particular applications, the water of the water treatment may be saturated steam or a mixture of liquid water and gas. In some applications, the water of the water treatment may be in a slurry. In some embodiments the phosphorus-treated zeolite is steamed with superheated steam prior to the water treatment.

A method of preparing a zeolite catalyst is also performed by treating a pentasil zeolite with a phosphorus compound prior to combining with any optional binder with the zeolite to form a phosphorus-treated zeolite having a phosphorus content of 5% or more by weight of the zeolite. The unbound phosphorus-treated zeolite is calcined. The unbound and calcined phosphorus-treated zeolite is contacted with water in a water treatment wherein at least a portion of the water is in a liquid phase to facilitate removal of at least 80% by weight or more of phosphorus from the phosphorus-treated zeolite and provide an increase the pore volume of the zeolite by at least 50% prior to the water treatment to form a modified phosphorus-treated zeolite catalyst.

In particular embodiments, the phosphorus-treated zeolite has a phosphorus content of from 1% to 25% by weight of the zeolite prior to the water treatment. In other embodiments, the phosphorus-treated zeolite has a phosphorus content of from 5% to 15% by weight of the zeolite prior to the water treatment.

In certain embodiments, the modified phosphorus-treated zeolite catalyst may exhibit an increase in any $^{27}Al$ MAS NMR peak at 50 ppm compared to the phosphorus-treated zeolite prior to the water treatment.

The pentasil zeolite may contain 10-membered ring pore openings. In certain instances, the zeolite may have a silica/alumina molar ratio of at least 25 or more and in others the zeolite may have a silica/alumina molar ratio of at least 200 or more.

The water treatment may occur at a temperature of from 25° C. to 120° C.

In certain embodiments, the final phosphorus content of the modified phosphorus-treated zeolite catalyst is from 3% or less by weight of the zeolite. In other embodiments the final phosphorus content of the modified phosphorus-treated zeolite catalyst may be from 0.5% to 2% by weight of the zeolite.

In certain instances, the modified phosphorus-treated zeolite catalyst may have a pore volume of 0.2 ml/g or more.

In certain applications, the water of the water treatment may be saturated steam or a mixture of liquid water and gas. In some applications, the water of the water treatment may be in a slurry. In some embodiments the phosphorus-treated zeolite is steamed with superheated steam prior to the water treatment.

In particular embodiments, the unbound phosphorus-treated zeolite is calcined at a temperature of 400° C. or higher prior to the water treatment.

The invention further includes a zeolite catalyst in the form of a phosphorus-containing zeolite having a phosphorus content of 7.5% or less by weight of zeolite and a $^{27}Al$ MAS NMR peak at 50 ppm that is greater than any other $^{27}$Al MAS NMR peak and a pore volume of 0.2 ml/g or more.

In specific embodiments, the phosphorus-containing zeolite has a phosphorus content of from 0.1% to 4.5% by weight of the zeolite.

The pentasil zeolite may contain 10-membered ring pore openings. In specific embodiments the zeolite is a ZSM-5 zeolite.

In certain instances, the zeolite may have a silica/alumina molar ratio of at least 25 or more and in others the zeolite may have a silica/alumina molar ratio of at least 200 or more.

BRIEF DESCRIPTION OF THE DRAWINGS

For a more complete understanding of the present invention, reference is now made to the following descriptions taken in conjunction with the accompanying figures, in which.

DETAILED DESCRIPTION

Figure 1:
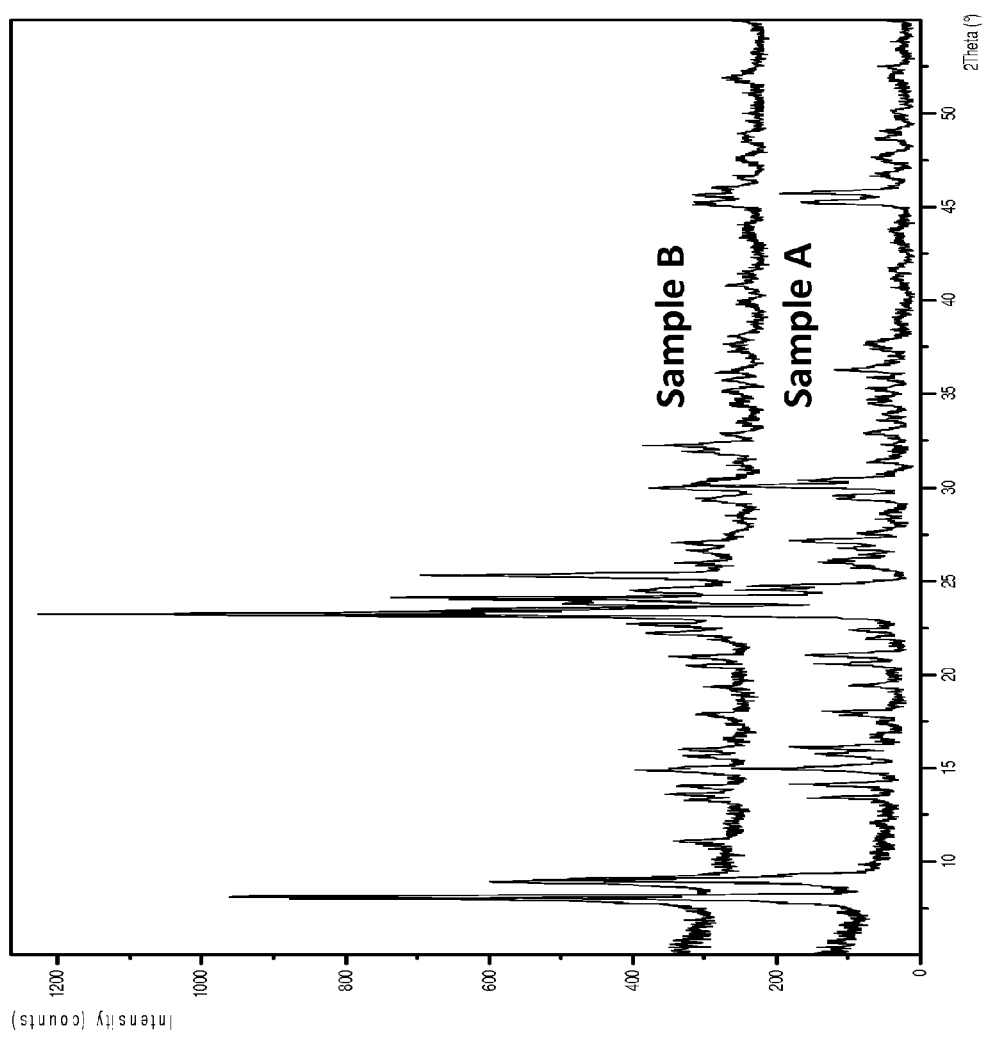
FIG. 1 is a plot of X-ray diffraction (XRD) patterns for a NH$_4$-ZSM-5 zeolite and a P-ZSM-5 zeolite (Samples A and B)

The zeolites in the present invention are those from the family of pentasil zeolites that contain five membered ring units or pentasil units in the framework structure. Such zeolites include ZSM-5, ZSM-11, ZSM-23, ferrierite, mordenite, etc. In particular, the zeolite may be a pentasil zeolite that contains 10-membered ring pore openings in the structure. Zeolites with 10-membered ring pore openings are also known as medium pore zeolites. Examples of such pentasil zeolite containing 10-membered ring pore openings or medium pores are ZSM-5, ZSM-11, etc.

Silicalite also constitutes a pentasil zeolite having 10-membered ring pore openings. Silicalites are isotypic or have crystalline structures that are the same or similar to ZSM-5 or MFI (International Zeolite Association nomenclature of ZSM-5) aluminosilicate zeolites. For instance, U.S. Pat. No. 4,061,724, incorporated herein by reference in its entirety for all purposes, describes such compounds. Such silica compounds are known in the art as "silicalites." Silicalites are also later described in the article presented in Nature, Vol. 271, *Silicalite, A New Hydrophobic Crystalline Silica Molecular Sieve*, E. M. Flanigen, et al., (February 1978), pp. 512-516, which is herein incorporated by reference for all purposes. As used herein, the term "silicalite" is meant to refer to those compositions described in U.S. Pat. No. 4,061,724. Such silicalites are formed from precursors of silica materials that contain little or no alumina (Al$_2$O$_3$).

Of the pentasil zeolites, ZSM-5 zeolite is one of the most versatile and commonly used zeolites as a catalyst in various reactions. Because of this, the invention has particular application to ZSM-5 zeolites and so is used and discussed herein as an exemplary pentasil zeolite catalyst. The ZSM-5 zeolites and their preparation are described in U.S. Pat. No. 3,702,886, which is herein incorporated by reference. The invention has application to other pentasil zeolites, however, such as those previously discussed. The ZSM-5 zeolite has two-dimensional pore structure consisting of straight channels (5.4 Å×5.6 Å) that are intersected by sinusoidal channels (5.1 Å×5.7 Å) with a maximum diameter of about 9 Å at the intersection.

ZSM-5 zeolites are aluminosilicates that contain both silicon and aluminum in the crystalline structure. In the present invention, the starting ZSM-5 zeolite may have a silica/alumina molar ratio of from about 25 or higher, more particularly from about 25 to about 1000 or higher prior to modification, more particularly, the silica/alumina molar ratio may be from about 25, 30, 50, 80, 100, 200, 250, 280, 300, 350, 400, 500 to about 1000 or more, including any and all data points within such range and the end points of such range. In certain applications, the ZSM-5 zeolite may have a silica/alumina molar ratio of from about 200 or more, and still more particularly from about 200 to about 400 or more, prior to modification. The starting ZSM-5 zeolite may be an NH$_4$$^+$ or H$^+$ form and may contain traces of other cations.

It should be understood that with respect to any concentration or amount range listed or described in the summary and detailed description as being useful, suitable, or the like, it is intended to include every concentration or amount within the range, including the end points, and is to be considered as having been specifically stated. For example, "a range of from 1 to 10" is to be read as indicating each and every possible number along the continuum between about 1 and about 10. Thus, even if specific data points within the range, or even no data points within the range, are explicitly identified or refer to only a specific few, it is to be understood that the inventors appreciate and understand that any and all data points within the range are to be considered to have been specified, and that the inventors are in possession of the entire range and all points within the range.

To provide various properties to the ZSM-5 zeolite or other pentasil zeolite, the zeolite is modified by treating it with phosphorus-containing compounds. In the present invention, the zeolite is modified with phosphorus. Such phosphorus-containing compounds may include, but are not limited to, phosphonic, phosphinous, phosphorus and phosphoric acids, salts and esters of such acids and phosphorous halides. In particular, phosphoric acid (H$_3$PO$_4$) and ammonium hydrogen phosphate ((NH$_4$)$_2$HPO$_4$) may be used as the phosphorus-containing compound. Such phosphorus-treated catalysts may contain phosphorus (P) in an amount of from about 1 wt % to about 25 wt % or more by weight of the zeolite after the phosphorus treatment. In certain embodiments, the phosphorus content may be from about 5 wt % to 15 wt % or more by weight of the zeolite after phosphorus treatment. In other embodiments, the phosphorus content may be from about 7 wt % to 12 wt % by weight of the zeolite after phosphorus treatment.

The phosphorus treatment may be carried out by various techniques. This may include aqueous phosphorus treatment of the zeolite. The treatment may include slurry evaporation, wet incipient and spray-dry methods. Solid-solid mixing of the zeolite and a phosphorus compound followed by bringing the mixture in contact with water as a liquid or vapor phase may also be used.

In slurry evaporation, the phosphorus may be incorporated into the catalyst by preparing a slurry of the zeolite and an aqueous solution of the phosphorus compound. Heating of the slurry may be used to facilitate treatment of the zeolite and to evaporate liquids. Heating of the slurry to temperatures of from about 25° C. or more, with from about 70° C. to about 100° C. being suitable in most instances. The slurry may also be stirred or agitated during this step to ensure uniform treatment. Heating the zeolite slurry to near complete evaporation of the liquid causes the formation of dough which can be dried or calcined to form powder or particles. The evaporation of the liquid from the zeolite slurry can be alternatively achieved by using a spray-dry technique.

In the wet incipient method, an aqueous solution of the phosphorus compound is added, such as by spraying, to dry zeolite without forming a slurry. The dry zeolite, which may be initially in the form of a powder, may be mixed with the phosphorus compound or its aqueous solution. If necessary, water may be added to the mixture of zeolite powder and phosphorus containing compound or its solution to facilitate homogeneous or uniform interaction between them.

The unbound phosphorus-treated zeolite is then calcined at a temperature of about 250° C. or more, more particularly, a temperature from about 300° C. to about 700° C., and more particularly from about 400° C. to about 570° C., in an environment containing oxygen, typically air. Calcining may take place over time, typically from several minutes to one hour or more. Calcining may also take place by gradually increasing the temperature over time.

After calcination, the zeolite may optionally undergo a steaming step using superheated steam (i.e., dry steam or steam with no liquid water present). As used herein, the expressions "steaming," "steamed," and similar expressions are meant to refer to the contacting of the zeolite with such superheated steam and are to be distinguished from the water treatment(s) discussed later on unless expressly stated so or as may be otherwise apparent from the context. The catalyst may be steamed at a temperature of 200° C. or more, more particularly at a temperature of from about 200° C. to about 600° C. or higher. Pressures during steaming may typically range from atmospheric to about 50 psig (344.7 kPa) or 100 psig or more. Steaming may be carried out from a few minutes to several hours. The steaming may occur in the presence of hydrogen gas ($H_2$), air or other inert gas flow. In other embodiments no steaming may be conducted after calcinations and prior to the water treatment as will now be discussed.

The unbound phosphorus-treated calcined zeolite powder, with or without steaming, is modified using a novel water treatment that alters the characteristics and properties of the phosphorus-containing zeolite. The water treatment is carried out by contacting the calcined phosphorus-treated zeolite powder with liquid water. This may be in the form of liquid water or a stream containing essentially wet or liquid water. This may include saturated steam or a mixture of liquid water and a gas, such as water and hydrogen gas. Accordingly, as used herein, the expression "water treatment" and similar expressions are meant to encompass the treatment of the unbound phosphorus-containing zeolite powder with liquid water or a combination or mixture of liquid water and steam or other gas and is to be distinguished from "steaming," as it has been defined and described previously.

In most instances, the water treatment is conducted at a temperature of from above 0° C. to about 100° C., with the pressure conditions being at or around atmospheric pressure conditions or that allow for the presence of some portion of liquid water. There may be other instances, however, where the pressure is below or above atmospheric pressure. In such instances, the liquid water treatment is conducted at a temperature to ensure that the water temperature is at or above the water's freezing point and at or about the boiling point for the particular pressure conditions to ensure that at least a portion (e.g., 1% or more) of the water is in the liquid phase. In many applications, the liquid water treatment is carried out at a temperature of about 25° C. (room temperature) to about 120° C. In certain applications, temperatures of from about 50° C., 60° C. or 70° C. to about 100° C., 110° C. or 120° C. may be used in the water treatment. In certain embodiments, the liquid water treatment may be carried out at a temperature of from about 50 or 60° C. to about 90° C. or 100° C.

The water treatment facilitates the removal of significant amounts of phosphorus from the phosphorus-treated zeolite. In particular, the water treatment should be carried out to facilitate final removal of about 70% by weight or more of phosphorus from the unbound phosphorus-treated zeolite. This amount includes any phosphorus that may be removed by any optional steaming conducted prior to the water treatment. Testing has shown that steaming (i.e., with superheated steam) typically results in less than 20% by weight of phosphorus being removed from the phosphorus-treated zeolite. Thus, steaming alone is insufficient to remove the required amount of phosphorus from the unbound phosphorus-treated zeolite. The water treatment thus facilitates significant amounts of phosphorus being removed from the zeolite. In certain instances, from about 70% to about 90% or more phosphorus is removed from the phosphorus-treated zeolite after the water treatment.

The final amount of phosphorus in the zeolite after water treatment will typically be from 7.5% or less by weight of the zeolite. In certain applications, the amount of phosphorus remaining in the zeolite will be from 0.1% to 4.5% by weight of the zeolite. In other embodiments the phosphorus remaining in the zeolite will be from 0.5 to 2% or 3% by weight of the zeolite.

The water treatment also facilitates altering the pore volume of the unbound phosphorus-treated zeolite. In particular, the water treatment should be carried out in a manner to facilitate an increase of in the pore volume of the zeolite by at least 50% compared to the zeolite prior to the water treatment. In particular embodiments, the pore volume increase may be 50%, 60%, 70%, 80%, 90%, 100%, 110%, 120% or more.

Various methods of the water treatment may be used. The water treatment used, however, should be sufficient to provide the properties described herein. In one method of the water treatment, the unbound and calcined phosphorus-treated zeolite, with or without prior steaming, is contacted with a gaseous water treatment wherein the zeolite is contacted with liquid water in a gas stream. In the gaseous water treatment the water may be in the form of saturated steam (i.e., water at boiling point), containing both liquid water and water vapor. The saturated steam may be a pure saturated steam or it may be mixed other non-water gases. The non-water gases may include hydrogen gas or another gas (e.g., $N_2$, $CO_2$, light alkanes, air, etc.), which may be an inert gas, or combination of such gases.

Alternatively, where the water treatment is carried out below the boiling point of water, the gaseous water treatment may utilize a mixture of liquid water and a non-water gas. Such treatment may be carried out by bubbling or passing flowing hydrogen or other gas through liquid water at conditions above the water's freezing point and below or at the water's boiling point so that some amount of the liquid water is entrained within the flowing gas diluent.

In certain embodiments, the gaseous water treatment may take place during cooling that initially starts as a steam treatment where the zeolite is treated with superheated steam at elevated temperatures in a steaming step, but then the temperature is reduced so that the zeolite is eventually contacted and treated with the liquid water as the steam cools to saturated steam and/or liquid water entrained or mixed with a non-water gas stream. The duration of the gaseous water treatment may range from a few minutes to several hours or even days.

In one method for the water treatment, the water treatment is carried out by mixing or immersing the phosphorus-treated zeolite in a liquid water bath or slurry. The immersion time may vary from a few minutes to several hours or even days. In most embodiments, the immersion time will range from about one hour to several hours or days. The immersion may be carried out with or without agitation of the zeolite within the water bath, with the provision that such immersion technique provides the desired final properties described herein.

In another method, the water treatment includes contacting the phosphorus-treated zeolite in a flowing liquid water stream where the water is at least partially in a liquid phase. This may be done by contacting the zeolite in a forced stream containing liquid water. The flowing liquid water stream may also contain a non-water gas diluent. The duration of the flowing liquid stream may range from a few minutes to several hours or even days. The duration times for the flowing liquid stream without the use of any gas diluents may be the same as those for the water bath or may be shorter.

The removal of large amounts of phosphorus from the phosphorus-treated zeolite and the increase in pore volume provided by the water treatments described herein is likely due to the removal of various phosphorus species (hereinafter called debris) from the zeolite channels. Such debris may include occluded phosphates, phosphates bonded with non-framework aluminum and silicon, and amorphous alumina.

In addition to the removal of phosphorus and increase in pore volume of the zeolite, the water treatment also results in an increase in framework or tetrahedral aluminum of the zeolite. This has been confirmed by an exhibited increase in the $^{27}$Al MAS NMR peak intensity at 50 ppm, which is assigned to tetrahedral or framework aluminum of the zeolite. Dealumination or a loss of framework or tetrahedral aluminum, which is shown by a decrease in the $^{27}$Al MAS NMR peak intensity at 50 ppm, typically results from the phosphorus treatment and calcinations of the zeolite. The increase in tetrahedral or framework aluminum of such modified zeolites is therefore unexpected. The water treatment described herein results in an increase in $^{27}$Al MAS NMR peak intensity at 50 ppm, as well as a decrease or disappearance of a strong (doublet) $^{27}$Al MAS NMR peak between −10 ppm and −20 ppm that is assigned to octahedral aluminum (non-framework Al). Thus, there is an increase in the ratio of framework aluminum to total aluminum provided by the water treatment. The increased $^{27}$Al MAS NMR peak at 50 ppm due to the water treatment may be greater than any other $^{27}$Al MAS NMR peak within the spectrum.

Furthermore, this realumination or increase in framework aluminum occurs without the addition of additional reactants or modifying agents. Realumination of certain dealuminated zeolites upon the addition of bases, such as KOH, to provide basic or alkali conditions (pH>7) or with the addition of aluminum isopropoxide, for example, is known. In the present invention, the water treatment may be at acidic or conditions where the pH is from 7 or below, with the lower pH being caused by phosphorus or loosely bound phosphates from the phosphorus treatment, which may make the water used during the water treatment acidic. No added bases (e.g., KOH, NaOH, etc.), acids (e.g., HCl, acetic acid, benzoic acid, $H_2SO_4$, nitric acid, mineral acids, etc.), ammonium salts or compounds, added aluminum compounds (e.g., $Al(NO_3)_3$, $Al_2(SO_4)_3$, etc.) or other reactants or modifying agents are needed or may be used during the water treatment.

After the water treatment, any residual water may be separated from the zeolite, such as through filtration, decantation, etc. Further heating to dry the zeolite after the water treatment may also be carried out. Typical drying temperatures may range from about 70° C. to 120° C. and higher.

An additional calcination step may also be employed after the water treatment using the calcination temperatures and times previously discussed.

The water treated phosphorus-modified zeolite can be used as catalyst, and may be optionally bound with a binder to form into a shaped body. The binder materials may include inorganic oxide materials, such as alumina, clay and silica materials. The binder may be used to provide a desired shape to the catalyst, for example, 1/16-inch cylindrical shaped extruded catalyst. In particular, a binder of an aluminum-containing material, such as alumina, clay, aluminum phosphate, silica-alumina or other-aluminum containing material, or their combinations, may be particularly useful. The bound catalyst may contain from about 1 wt % to about 99 wt % of binder material by total weight of the catalyst. In some applications the binder may be present in an amount of from about 10 wt % to about 50 wt % binder by total weight of catalyst.

The water-treated phosphorus-containing zeolite, bound or unbound, may also undergo a further steaming step prior to the initial use as a catalyst. The catalyst may be steamed at a temperature of between 200 and 600° C. or higher before using the catalyst in any reaction. The steaming can be carried out in-situ or ex-situ of the reactor. In other embodiments no further steaming may be conducted after the water treatment.

After drying and/or calcinations and any further steam treatment, the water-treated, phosphorus-containing zeolite may be used as a catalyst for various reactions.

EXAMPLES

Phosphorus Treatment of ZSM-5 Zeolite

The materials used for making the catalysts of the examples are described in Table 1. The starting material was a $NH_4$-ZSM-5 zeolite powder having a $SiO_2/Al_2O_3$ mole ratio (SAR) of 308 (Sample A, Table 2). The $NH_4$-ZSM-5 powder was treated with phosphoric acid by adding the acid to the zeolite powder while mixing them together. Water was added to make the zeolite powder homogeneously moist. The weight ratio (as-is basis, shown in Table 1) of zeolite:$H_3PO_4$:$H_2O$ was 1.00:0.48:0.04. The phosphorus-treated ZSM-5 zeolite (herein after called P-ZSM-5) was then calcined using a programmed temperature profile with a maximum temperature of 530° C. for about 2.5 h (Sample B, Table 2). The P-ZSM-5 (Sample B, Table 2) was used as a precursor for preparing Catalyst Samples C—F.

TABLE 1

| Component | Source |
|---|---|
| $NH_4$-ZSM-5 (SAR 308), Moisture 0.15 wt. %[a] | Zeolyst |
| Phosphoric acid ($H_3PO_4$), 85 wt. % in aqueous | Sigma-Aldrich |
| Nitric acid ($HNO_3$), ACS Reagent, 70% | Sigma-Aldrich |
| Water, Deionized (DI) | SABIC lab |

[a]Free Moisture at 110° C. 16 h

Analysis of Parent $NH_4$-ZSM-5 and P-ZSM-5

Both parent $NH_4$-ZSM-5 (Sample A, Table 2) and P-ZSM-5 (Sample B, Table 2) were analyzed for Si, Al, and P, and for specific BET surface area (BET SA) and total pore volume ($PV_{total}$). Elemental analysis of the catalysts was performed by X-ray fluorescence and weight percentage (wt. %) of Si, Al and P, with the results included in Table 2. Multi-point $N_2$ sorption was done at liquid $N_2$ temperature (−196° C.) at P/Po=0.03 to 0.99. The catalyst samples were degassed under vacuum (<20 mTorr) at 300° C. Specific BET SA was calculated using BET method, and $PV_{total}$ was calculated from the $N_2$ uptake at P/Po=0.99. As shown in Table 2, the P-ZSM-5 zeolite (Sample B) contained 35.96 wt % Si, 0.23 wt % Al and 8.74 wt % P, and had a BET SA of 182 m$^2$/g and a total pore volume of 0.12 ml/g. Both BET SA and $PV_{total}$ of the P-ZSM-5 (Sample B) decreased significantly with the phosphorus treatment of the $NH_4$-ZSM-5 zeolite powder (Sample A).

The X-ray diffraction pattern (XRD) for the parent $NH_4$-ZSM-5 and P-ZSM-5 (Samples A and B, Table 2) were recorded on a Phillips (X-Pert model) diffractometer over a range of 5-55° at a scan rate 2° per minute using $CuK\alpha 1$ radiation. The XRD patterns of the $NH_4$-ZSM-5 and P-ZSM-5 are shown in FIG. 1. In general, the intensities of ZSM-5 peaks decreased for P-ZSM-5 due to phosphorus treatment and calcinations of the zeolite. The decrease of the peak intensity is attributed to the loss of crystallinity or removal of T-atoms from the zeolite structure. The crystallinity of P-ZSM-5 was measured by integrating peak area of the characteristic peaks at $2\theta=21.5°$ to $25°$, and then comparing that with the starting $NH_4$-ZSM-5 zeolite. The phosphorus treatment of the zeolite causes the removal of T-atoms resulting in loss of crystallinity (crystallinity of P-ZSM-5 is about 60%). New peaks appeared at $2\theta=11.01$ and $25.3°$ and the intensities of peaks at $2\theta=21.90$ and $32.25°$ increased after P-modification of the ZSM-5 zeolite. The appearance of the new peaks may be due to the presence of silica-aluminophosphates (SAPO) and/or aluminophosphates (AlPO) type materials in the P-ZSM-5.

TABLE 2

| Sample/Catalyst | Description | Composition, wt % | | | SA, m²/g | $PV_{total}$ mL/g |
|---|---|---|---|---|---|---|
| | | Si | Al | P | | |
| A | $NH_4$-ZSM-5, SAR 308 | 47.16 | 0.29 | N/A | 376 | 0.23 |
| B | P-treated ZSM-5 | 35.96 | 0.23 | 8.74 | 182 | 0.12 |
| C | slurried with $H_2O$, 25° C. | 39.21 | 0.25 | 5.60 | 224 | 0.171 |
| D | slurried with $H_2O$, 70° C. | 43.15 | 0.25 | 2.69 | 275 | 0.241 |
| E | slurried with $H_2O$, 84° C. | 43.88 | 0.24 | 1.90 | 283 | 0.248 |
| F | slurried with $H_2O$, 97° C. | 46.13 | 0.26 | 1.05 | 305 | 0.256 |

N/A = not applicable, that is, sample contains no P

Example 1

Catalyst Samples C-F

A weighed amount of P-ZSM-5 zeolite powder (Sample B) was slurried with water in water treatments for 4 hours at different temperatures to make catalyst Samples C-F (conditions are shown below and in Table 2). The pH of the slurry was about 1.0. The slurry was filtered and dried at a temperature between 90° C. and 110° C. overnight. The samples were analyzed for Si, Al and P by XRF method, for BET SA and $PV_{total}$ by $N_2$ sorption (described earlier), and the results are included in Table 2.

Sample C
Slurry: 10.05 g P-ZSM-5 (Sample B, Table 2), Water 50 mL
Slurry stirred at about 25° C. for about 4 h
Filtered, dried at 110° C. overnight Sample D
Slurry: 5.01 g P-ZSM-5 (Sample B, Table 2), Water 50 mL
Slurry heated at 70° C., stirred 4 h, maintained slurry volume by adding 70° C.-water
Filtered, dried at 90° C. overnight Sample E
Slurry: 2.53 g P-ZSM-5 (Sample B, table 2), Water 40 mL
Slurry heated at 84° C., stirred 4 h, maintained slurry volume by adding 84° C.-water
Filtered, dried at 90° C. overnight Sample F
Slurry: 10.08 g P-ZSM-5 (Sample B, Table 2), Water 50 mL
Slurry heated at 97° C., stirred 4 h, maintained slurry volume by adding 97° C.-water
Filtered, dried at 110° C. overnight Table 3 shows the percentage of phosphorus loss and increase of $PV_{total}$ after the P-ZSM-5 (Sample B) was slurried with water at different conditions. The P-ZSM-5 lost about 40% P resulting in an increase about 40% total pore volume when the zeolite was slurried with liquid water at about 25° C. (Sample C). However, when the P-ZSM-5 was slurried at 70° C. (Sample D), at 84° C. (Sample E), and at 97° C. (Sample F) the P-ZSM-5 zeolite lost about 70% or more P of its initial content. When the P-ZSM-5 was slurried in a water treatment at 70° C. or higher, BET SA was found to increase by about 50% or more and also total the pore volume ($PV_{total}$ was increased by about 100% or more relative to the P-ZSM-5. Table 4 shows the change in BET SA and $PV_{total}$ compared to the parent zeolite (Sample A) and P-ZSM-5 (Sample B).

TABLE 3

| | Phosphorus, wt. % | | |
|---|---|---|---|
| Catalyst | Before Slurried | After Slurried | % P Loss |
| C | 8.74 | 5.60 | 35.9 |
| D | 8.74 | 2.69 | 69.2 |
| E | 8.74 | 1.90 | 78.3 |
| F | 8.74 | 1.05 | 88.0 |

TABLE 4

| | Change in BET SA | | | Change in $PV_{total}$ | | |
|---|---|---|---|---|---|---|
| Sample/Catalyst | BET SA, m²/g | % Change relative to parent zeolite | % Change relative to P-treated zeolite | PVtotal, ml/g | % Change relative to parent zeolite | % Change relative to P-treated zeolite |
| A | 376 | | | 0.231 | | |
| B | 182 | −52 | | 0.120 | −48 | |
| C | 224 | −40 | 23 | 0.171 | −26 | 43 |
| D | 275 | −27 | 51 | 0.241 | 4 | 101 |
| E | 283 | −25 | 55 | 0.248 | 7 | 107 |
| F | 305 | −19 | 68 | 0.256 | 11 | 113 |

Example 2

Catalyst Samples G-I

A P-treated ZSM-5 (Sample B) was pressed, crushed and sieved to obtain 20-40 mesh zeolite for loading in a stainless steel (SS) tube reactor for steaming at various conditions. A weighed amount of sized P-ZSM-5 was loaded in a reactor, dried at 200° C. (at atmospheric pressure) for about an hour under $H_2$ flow. To prepare catalyst Samples G, H and I, the P-ZSM-5 (Sample B) was steamed with superheated steam by flowing $H_2O$ and $H_2$ via a vaporizer at 200° C. and maintaining the catalyst bed temperature at 200° C., or 400° C. or 600° C. Catalyst loading, $H_2O$ and $H_2$ flow rates, temperature, reactor inlet pressure, and steaming time are shown in Table 5. The steamed P-ZSM-5 catalyst was then cooled to room temperature while $H_2O/H_2$ flow continued overnight at room temperature. The continued flow of $H_2O/H_2$ flow during cooling constituted the water treatment. Note that the vaporizer was turned off while the steamed catalyst was treated with $H_2O/H_2$ flow during the water treatment at room temperature or during cooling of the catalyst.

TABLE 5

| Sample/ Catalyst | P-ZSM-5, g | Steaming Conditions | | | | | Post Steaming Conditions | | | |
|---|---|---|---|---|---|---|---|---|---|---|
| | | $H_2$, cc/min | $H_2O$, g/min | Temp, ° C. | P, psig | Time, h | $H_2$, cc/min | $H_2O$, g/min | Temp, ° C. | Time, h |
| G | 4.23 | 459 | 0.06 | 200 | 50 | 1 | 459 | 0.06 | 25 | 16 |
| H | 4.23 | 459 | 0.06 | 400 | 50 | 1 | 459 | 0.06 | 25 | 16 |
| I | 4.23 | 459 | 0.12 | 600 | 50 | 1 | 459 | 0.12 | 25 | 16 |

Table 6 lists the phosphorus content and total pore volume of the modified P-ZSM-5 of catalyst Samples G, H and I that were each steamed and contacted with $H_2O/H_2$ while the steamed P-ZSM-5 was cooled to room temperature with a continuous $H_2O/H_2$ flow at room temperature. This post steaming contact of the P-ZSM-5 zeolite with the $H_2O/H_2$ flow while cooling constituted the water treatment. As seen in Table 6, post treatment of the steamed P-ZSM-5 catalysts (Samples G, H and I) with the $H_2O/H_2$ flow resulted in a loss of about 90% phosphorus for each sample. As shown in Table 7, BET SA was found to increase by about 50% or more and the total pore volume also increased by about 100% when the steamed P/ZSM-5 catalyst was contacted with $H_2O/H_2$ while cooling to room temperature. The steamed P-ZSM-5 zeolite was contacted under continuous flow of $H_2O/H_2$ during cooling from steaming temperature to about 25° C. As is shown in the comparative examples described later on, if the steamed P-ZSM-5 is not cooled under $H_2O/H_2$ flow, but rather cooled under $H_2$ flow without water, a significant difference was observed in P loss and $PV_{total}$ change.

TABLE 6

| | Phosphorus, wt. % | | |
|---|---|---|---|
| Catalyst | Before Steaming & Post Steaming | After Steaming & Post Steaming | % P Loss |
| G | 8.74 | 0.74 | 91.5 |
| H | 8.74 | 0.80 | 90.8 |
| I | 8.74 | 0.74 | 91.5 |

TABLE 7

| | | Change in BET SA | | Change in $PV_{total}$ | | |
|---|---|---|---|---|---|---|
| Sample/ Catalyst | BET SA, $m^2/g$ | % Change relative to parent zeolite | % Change relative to P-treated zeolite | $PV_{total}$, ml/g | % Change relative to parent zeolite | % Change relative to P-treated zeolite |
| A | 376 | | | 0.231 | | |
| B | 182 | −52 | | 0.120 | −48 | |
| G | 288 | −23 | 58 | 0.233 | 1 | 94 |
| H | 295 | −22 | 62 | 0.251 | 9 | 110 |
| I | 307 | −18 | 69 | 0.248 | 7 | 107 |

MAS NMR of $^{27}$Al of Samples

Solid state Magic Angle Spinning (MAS) NMR spectra of NH$_4$-ZSM-5 and P-ZSM-5 zeolite (Samples A and B) were recorded with 400 MHz spectrometer ($^{27}$Al at 104.5 MHz) at room temperature. The samples were packed in silicon nitride rotors (Si$_3$N$_4$) and spun at 13 to KHz sample spinning (about 800000 rpm). A 10 degree tip and recycle delay of 0.5 s were used to avoid saturation. About 4000 to 10000 scans were accumulated to signal average and improve signal/noise ratio. Proton decoupling was not employed. All spectra were referenced to aluminum chloride hexahydrate (run separately in a tube) at 0.0 ppm on the chemical shift scale.

Figure 2:
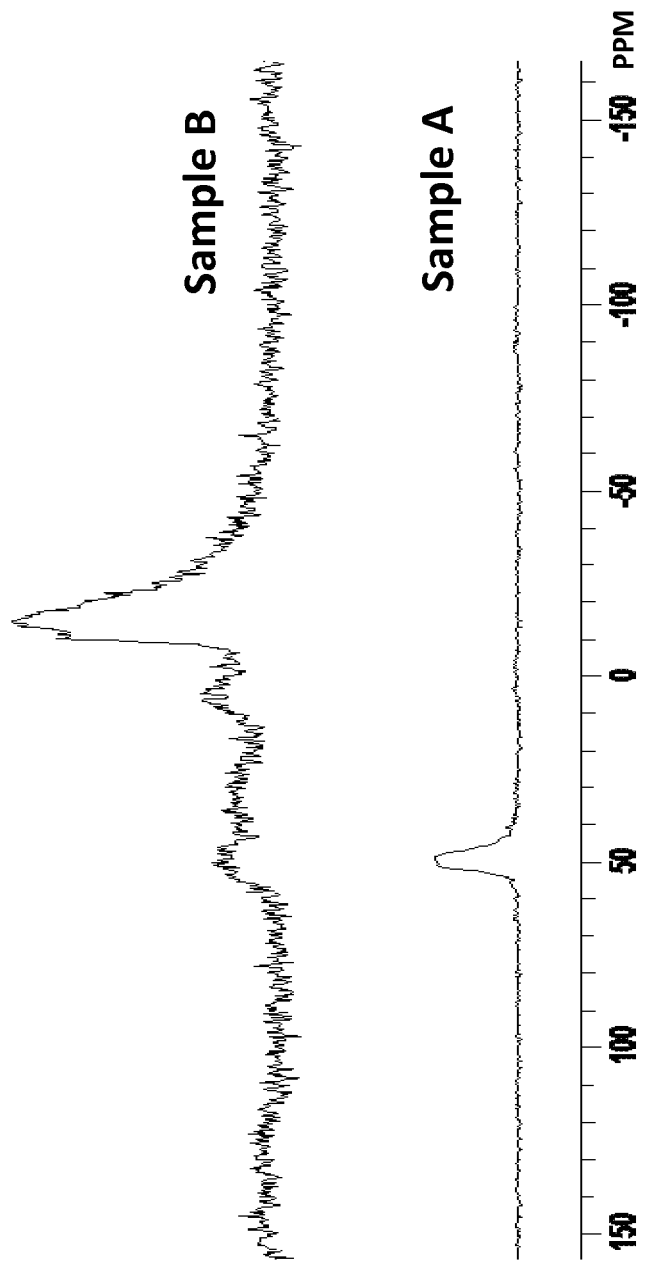
FIG. 2 is a plot of $^{27}$Al MAS NMR spectra for precursor Samples A and B.

The results for Samples A and B are presented in FIG. 2. A sharp strong peak at around 50 ppm can be seen for the NH$_4$-ZSM-5 zeolite attributed to structural tetrahedral aluminum. The peak at about 50 ppm decreased significantly when the zeolite powder was treated with phosphoric acid and calcined, suggesting that the phosphoric acid treatment of ZSM-5 removed the framework aluminum appreciably. The adjacent peak (30-40 ppm) is due to severely distorted but still in the framework aluminum atoms, most likely either 3 or 5 coordination with oxygens. Also, a weak peak around 0 ppm was observed and may be assigned to amorphous alumina. The biggest peak (doublet) in the spectrum between −10 ppm and −20 ppm, which was centered at about −14 ppm (hereinafter "the −14 ppm peak"), is from octahedrally coordinated aluminum atoms that are formed when tetrahedrally coordinated framework aluminum is removed from the zeolite framework by the phosphate modification.

Figure 3:
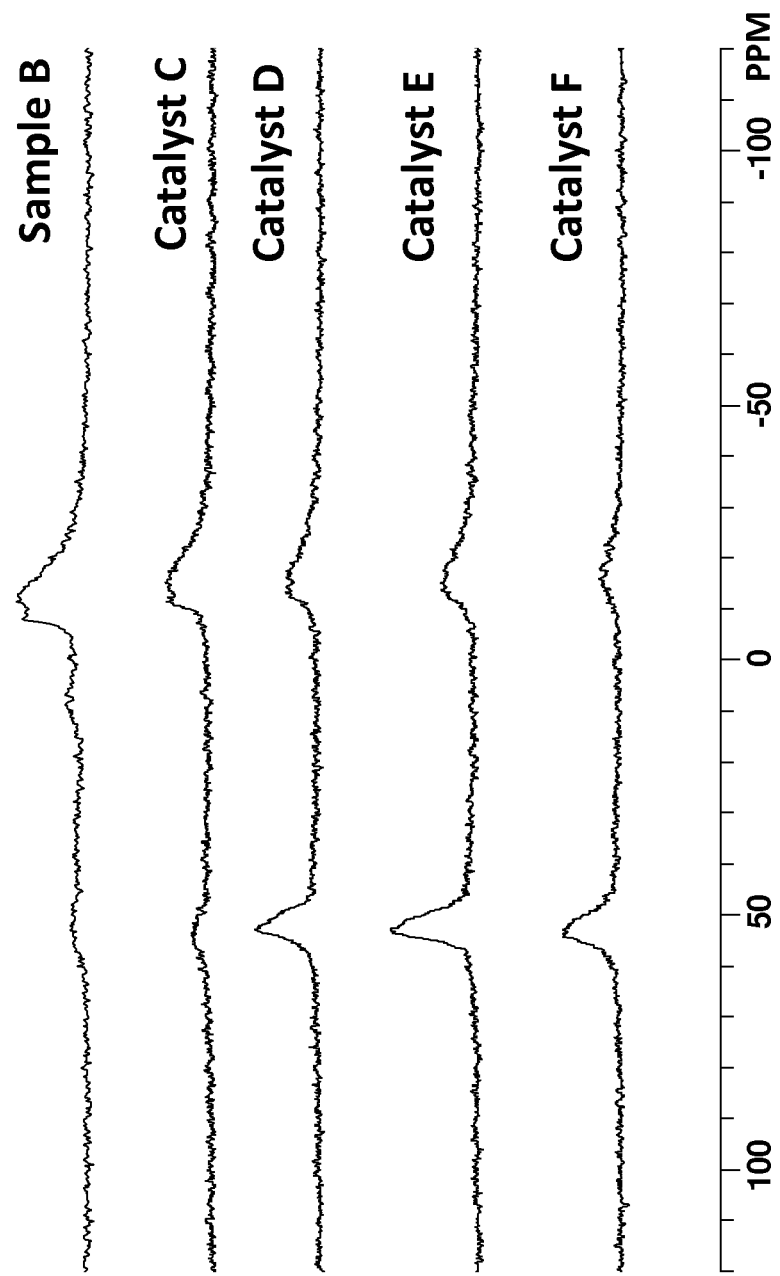
FIG. 3 is a plot of $^{27}$Al MAS NMR spectra for precursor Sample B and catalyst Samples C, D, E, and F, which are P-ZSM-5 zeolites slurried with water at different temperatures.
Figure 4:
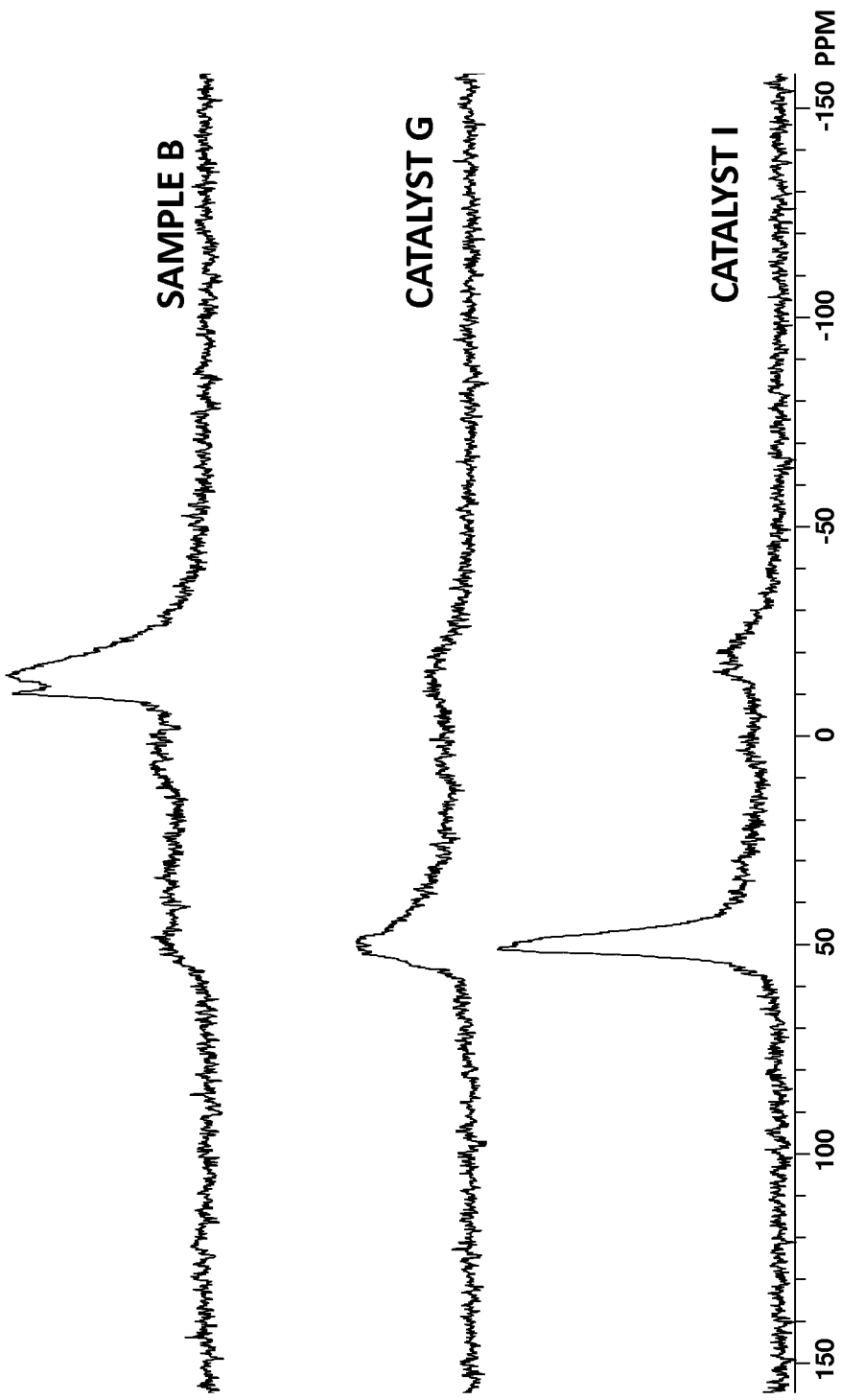
FIG. 4 is a plot of $^{27}$Al MAS NMR spectra for Sample B and catalysts Samples G and I, which are both P-ZSM-5 zeolites steamed and subsequently treated in a water treatment.

FIG. 3 shows $^{27}$Al MAS NMR spectra of P-ZSM-5 (Sample B), and catalyst Samples C-F. FIG. 3 shows that the peak at about 50 ppm increased with the decrease of the −14 ppm peak when the P-ZSM-5 was slurried in a water treatment at different conditions. Note that $^{27}$Al MAS NMR spectra were recorded with somewhat varied amounts of samples. In order to compare Al peaks, the peak integrals (at 50 ppm) for parent NH$_4$-ZSM-5 (Sample A) was used as a base case; peaks of the other samples or catalysts were then integrated and were counted per unit mass as counts per milligram (cpm). The cpm therefore can be used as relative measure of Al content (to Sample A). The cpm of catalyst Samples C-F and G and I for tetrahedral Al and for octahedral Al are given in Table 8. Spectrum $^{27}$Al MAS NMR for Sample H was unavailable. In general, when P-ZSM-5 (Sample B) was slurried with water at different conditions, and also when the steamed P-ZSM-5 was brought in contact with H$_2$O/H$_2$ while being cooled to room temperature, the tetrahedral aluminum increased with the decrease of octahedral aluminum. Also, the ratio of Al$_{tetra}$/Al$_{total}$ for P-ZSM-5 was about 0.12 for Sample B, was 0.48-0.63 for Samples D-F, and was 0.80 for each of Samples G and I.

TABLE 8

| Sample/Catalyst | Description | Al$_{tetra}$ | Al$_{octa}$ | Al$_{tetra}$/Al$_{total}$ |
|---|---|---|---|---|
| A | NH$_4$-ZSM-5, SAR 308 | 17.4 | 0 | 1.00 |
| B | P-treated ZSM-5 | 0.7$^a$ | 5.2 | 0.12 |
| C | slurried with H$_2$O, 25° C. | 1.2 | 4.6 | 0.21 |
| D | slurried with H$_2$O, 70° C. | 4.2 | 4.6 | 0.48 |
| E | slurried with H$_2$O, 84° C. | 4.1 | 3.1 | 0.57 |
| F | slurried with H$_2$O, 98° C. | 4.1 | 2.4 | 0.63 |
| G | steamed 200° C., post treated with H$_2$O | 3.3 | 0.8 | 0.80 |
| I | steamed 600° C., post treated with H$_2$O | 4.4 | 1.1 | 0.80 |

$^a$Counts per mg under peak(s) between about 50 ppm and −10 ppm was about 1.7

Comparative Example 3

Preparation and Analysis of Comparative Catalyst Samples J-O

To form Comparative Samples J-O, the P-ZSM-5 zeolite powder of Sample B was pressed, crushed and sieved to obtain 20-40 mesh P-ZSM-5 zeolite for loading in a stainless steel (SS) tube reactor for steaming at various conditions. In a typical treatment, 4.23 g sized P-ZSM-5 was loaded in a reactor, dried at 200° C. (at atmospheric pressure) for about an hour under H$_2$ flow. The P-ZSM-5 was steamed at a temperature of between 200° C. and 600° C. by flowing H$_2$O and H$_2$ via a vaporizer at 200° C. Sample loading, H$_2$O and H$_2$ flow rates, temperature, reactor inlet pressure, and steaming time are shown in Table 9. The steamed P-ZSM-5 samples were cooled to room temperature under a H$_2$ purge without H$_2$O, and the H$_2$ purge was continued overnight (about 16 h) before removing the steamed catalysts from the reactor for analysis. Table 9 lists the steaming and post steaming conditions for Comparative Catalysts J-O.

Tables 10 and 11 list the phosphorus content and pore volume before and after steaming for each of Comparative Samples J-O. Comparative Samples J-O showed about 20% or less P loss and about 25% or less increase of PV$_{total}$. This is very different when compared to Samples G, H and I where the steamed P-ZSM-5 was cooled under a combined H$_2$O/H$_2$ flow and resulted in a significantly decrease of P and increase of PV$_{total}$.

Figure 5:
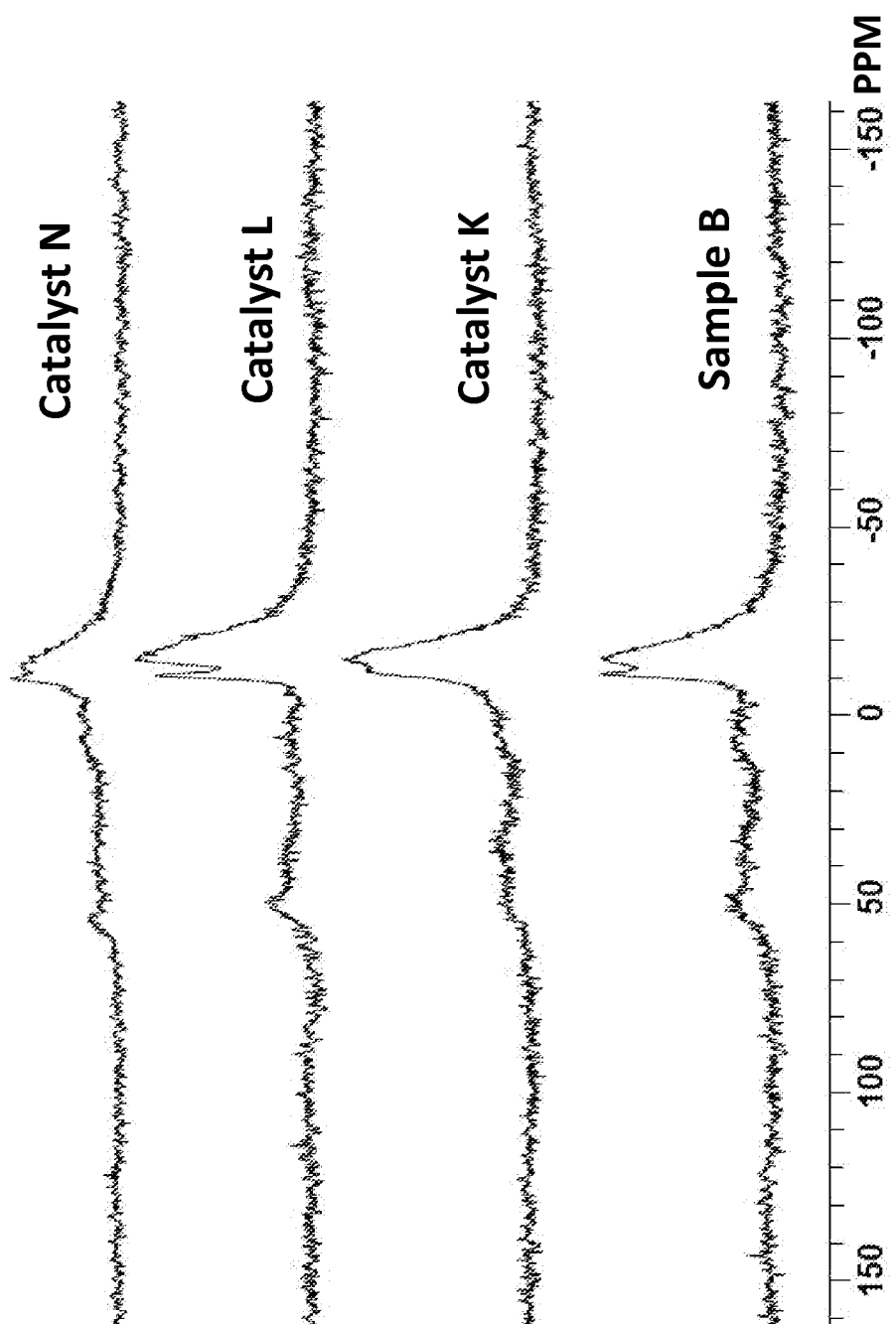
FIG. 5 is a plot of $^{27}$Al MAS NMR spectra for precursor Sample B and comparative catalyst Samples K, L and N, which are P-ZSM-5 zeolites that are steamed and cooled under H$_2$ flow without any water treatment.

FIG. 5 shows MAS NMR spectra of $^{27}$Al for P-ZSM-5 (Sample B) and Comparative Samples K, L and N that were obtained by steaming Sample B without a water treatment. The weak peaks at 50 ppm (assigned to tetrahedral Al) for Comparative Samples K, L and N remained almost unchanged. The counts per milligram for Al$_{tetra}$ for Comparative Samples J-O are also shown in Table 12 and show no increase in Al$_{tetra}$ compared to Sample B.

TABLE 9

| Comparative Catalyst | P-ZSM-5, g | Steaming Conditions | | | | | Post Steaming Conditions | | |
|---|---|---|---|---|---|---|---|---|---|
| | | H$_2$, cc/min | H$_2$O, g/min | temp., ° C. | P, psig | time, h | H$_2$, cc/min | temp., ° C. | time, h |
| J | 1.29 | 459 | 0.04 | 200 | atm. | 16 | 840 | 25 | 16 |
| K | 4.23 | 459 | 0.06 | 200 | 50 | 1 | 459 | 25 | 16 |
| L | 4.23 | 459 | 0.06 | 400 | 50 | 1 | 459 | 25 | 16 |
| M | 4.23 | 459 | 0.06 | 550 | 50 | 363 | 459 | 25 | 16 |
| N | 4.23 | 459 | 0.06 | 600 | 50 | 1 | 459 | 25 | 16 |
| O | 1.30 | 459 | 0.06 | 600 | 50 | 16 | 459 | 25 | 16 |

TABLE 10

| Comparative Catalyst | Phosphorus, wt. % | | |
|---|---|---|---|
| | Before Steaming | After Steaming | % P Loss |
| J | 8.74 | 8.52 | 2.5 |
| K | 8.74 | 7.74 | 11.4 |
| L | 8.74 | 7.44 | 14.9 |
| M | 8.74 | 7.07 | 19.1 |
| N | 8.74 | 8.55 | 2.2 |
| O | 8.74 | 7.26 | 16.9 |

TABLE 11

| Comparative Sample | Change in BET SA | | | Change in $PV_{total}$ | | |
|---|---|---|---|---|---|---|
| | BET SA, $m^2/g$ | % change relative to parent zeolite | % change relative to P-treated zeolite | $PV_{total}$, ml/g | % change relative to parent zeolite | % change relative to P-treated zeolite |
| A | 376 | | | 0.231 | | |
| B | 182 | −52 | | 0.120 | −48 | |
| J | 182 | −52 | 0 | 0.124 | −46 | 3 |
| K | 183 | −51 | 1 | 0.134 | −42 | 12 |
| L | 208 | −45 | 14 | 0.149 | −35 | 24 |
| M | 202 | −46 | 11 | 0.148 | −36 | 23 |
| N | 183 | −51 | 1 | 0.130 | −44 | 8 |
| O | 210 | −44 | 15 | 0.134 | −42 | 12 |

TABLE 12

| Comparative Sample | $Al_{tetra}$ | $Al_{octa}$ |
|---|---|---|
| B | 0.7[a] | 5.2 |
| J | 1.01 | 5.72 |
| K | b, c | 4.98 |
| L | 0.85[b] | 4.98 |
| M | b, c | 2.29 |
| N | b | 3.53 |
| O | 1.09 | 3.82 |

[a]Counts per mg under peak(s) between about 50 ppm and −10 ppm was about 1.7
[b]Traces or not measurable;
[c]Weak broad peak between 50 ppm and −10 ppm While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

I claim:

1. A method of modifying a phosphorus-treated zeolite catalyst comprising:
   contacting an unbound and calcined phosphorus-treated pentasil zeolite with water at a temperature of 70° C. to 120° C. in a water treatment to form a modified phosphorus-treated zeolite catalyst;
   wherein the zeolite has a pore volume prior to water treatment; and
   wherein at least a portion of the water is in a liquid phase to facilitate removal of at least 70% by weight or more of phosphorus from the phosphorus-treated zeolite and to provide an increase in the pore volume of the zeolite by at least 50%.

2. The method of claim 1, wherein:
   the phosphorus-treated zeolite has a phosphorus content of from 1% to 25% by weight of the zeolite prior to the water treatment.

3. The method of claim 1, wherein:
   the phosphorus-treated zeolite has a phosphorus content of from 5% to 15% by weight of the zeolite prior to the water treatment.

4. The method of claim 1, wherein:
   the modified phosphorus-treated zeolite catalyst exhibits an increase in any $^{27}Al$ MAS NMR peak at 50 ppm compared to the phosphorus-treated zeolite prior to the water treatment.

5. The method of claim 1, wherein:
   the zeolite has a silica/alumina molar ratio of at least 25 or more.

6. The method of claim 1, wherein:
   the zeolite has a silica/alumina molar ratio of at least 200 or more.

7. The method of claim 1, further comprising stirring during the water treatment.

8. The method of claim 1, wherein:
   the final phosphorus content of the modified phosphorus-treated zeolite catalyst is from 3% or less by weight of the zeolite.

9. The method of claim 1, wherein:
   the final phosphorus content of the modified phosphorus-treated zeolite catalyst is from 0.5% to 2% by weight of the zeolite.

10. The method of claim 1, wherein:
    the modified phosphorus-treated zeolite catalyst has a pore volume of 0.2 ml/g or more.

11. The method of claim 1, wherein:
    the water of the water treatment is saturated steam or a mixture of liquid water and gas.

12. The method of claim 1, wherein:
    the water of the water treatment is in a slurry.

13. The method of claim 1, wherein:
    the phosphorus-treated zeolite is steamed with superheated steam prior to the water treatment.

14. A method of preparing a zeolite catalyst comprising:
    treating a pentasil zeolite with a phosphorus compound prior to combining with any optional binder with the zeolite to form a phosphorus-treated zeolite having a phosphorus content of 5% or more by weight of the zeolite;
    calcining the unbound phosphorus-treated zeolite;
    contacting the unbound and calcined phosphorus-treated zeolite with water at a temperature of 70° C. to 120° C. in a water treatment to form a modified phosphorus-treated zeolite catalyst;
    wherein the zeolite has a pore volume prior to water treatment; and
    wherein at least a portion of the water is in a liquid phase to facilitate removal of at least 80% by weight or more of phosphorus from the phosphorus-treated zeolite and to provide an increase the pore volume of the zeolite by at least 50%.

15. The method of claim 14, wherein:
the phosphorus-treated zeolite has a phosphorus content of from 1% to 25% by weight of the zeolite prior to the water treatment.

16. The method of claim 14, wherein:
the phosphorus-treated zeolite has a phosphorus content of from 5% to 15% by weight of the zeolite prior to the water treatment.

17. The method of claim 14, wherein:
the modified phosphorus-treated zeolite catalyst exhibits an increase in any $^{27}$Al MAS NMR peak at 50 ppm compared to the phosphorus-treated zeolite prior to the water treatment.

18. The method of claim 14, wherein:
the zeolite has a silica/alumina molar ratio of at least 25 or more.

19. The method of claim 14, wherein:
the zeolite has a silica/alumina molar ratio of at least 200 or more.

20. The method of claim 14, further comprising stirring during the water treatment.

21. The method of claim 14, wherein:
the final phosphorus content of the modified phosphorus-treated zeolite catalyst is from 3% or less by weight of the zeolite.

22. The method of claim 14, wherein:
the final phosphorus content of the modified phosphorus-treated zeolite catalyst is from 0.5% to 2% by weight of the zeolite.

23. The method of claim 14, wherein:
the modified phosphorus-treated zeolite catalyst has a pore volume of 0.2 ml/g or more.

24. The method of claim 14, wherein:
the water of the water treatment is saturated steam or a mixture of liquid water and gas.

25. The method of claim 14, wherein:
the water of the water treatment is in a slurry.

26. The method of claim 14, wherein:
the phosphorus-treated zeolite is steamed with superheated steam prior to the water treatment.

27. The method of claim 14, wherein:
the unbound phosphorus-treated zeolite is calcined at a temperature of 400° C. or higher prior to the water treatment.

* * * * *